United States Patent
Fan

[19]

[11] Patent Number: 6,141,613
[45] Date of Patent: *Oct. 31, 2000

[54] APPARATUS AND METHOD FOR CONTROLLING THE STEERING OF A TRACKED MACHINE

[75] Inventor: Zhejun Fan, Dunlap, Ill.

[73] Assignee: Caterpillar Inc., Peoria, Ill.

[*] Notice: This patent issued on a continued prosecution application filed under 37 CFR 1.53(d), and is subject to the twenty year patent term provisions of 35 U.S.C. 154(a)(2).

[21] Appl. No.: 09/040,634

[22] Filed: Mar. 18, 1998

[51] Int. Cl.[7] .............................. F16D 43/20; B62D 11/08
[52] U.S. Cl. ............................... 701/50; 701/41; 701/67; 180/6.7; 192/54.3
[58] Field of Search .................................. 701/50, 41, 42, 701/67; 180/6.7, 8.7, 9.44, 9.64, 411, 422; 172/2, 7, 4.5; 192/54.3

[56] References Cited

U.S. PATENT DOCUMENTS

| | | |
|---|---|---|
| 4,702,358 | 10/1987 | Mueller et al. ....................... 192/13 R |
| 5,325,933 | 7/1994 | Matsushita ............................. 180/6.7 |
| 5,462,122 | 10/1995 | Yamamoto et al. ....................... 172/2 |
| 5,503,232 | 4/1996 | Matsushita et al. ...................... 172/2 |
| 5,566,288 | 10/1996 | Koerhsen ............................. 395/142 |
| 5,631,658 | 5/1997 | Gudat et al. ........................... 342/457 |
| 5,648,901 | 7/1997 | Gudat et al. ...................... 364/424.02 |
| 5,680,917 | 10/1997 | Bray ................................... 192/54.3 |
| 5,781,870 | 7/1998 | Okawa ................................. 701/25 |
| 5,787,374 | 7/1998 | Fergunson et al. ...................... 701/41 |
| 5,875,854 | 3/1999 | Yamamoto et al. ..................... 172/4.5 |
| 5,897,603 | 4/1999 | Henderson ............................ 701/207 |
| 5,928,309 | 7/1999 | Korver et al. ......................... 701/214 |
| 5,935,192 | 8/1999 | Henderson et al. ..................... 701/208 |

*Primary Examiner*—Tan Nguyen
*Attorney, Agent, or Firm*—Steve D. Lundquist

[57] ABSTRACT

The present invention is an apparatus and method to control the steering of a tracked machine having a clutch/brake steering system. The tracked machine has a left drive and a right drive. The left drive has a clutch and brake and the right drive has a clutch and brake. The present invention includes a navigator to determine a desired trajectory, determine a desired left drive velocity and a desired right drive velocity, and generate desired left and right drive velocity signals. The present invention also includes a left speed sensor and a right speed sensor to determine actual left and right drive velocities, and generate actual left and right drive velocity signals. A clutch/brake controller is included to receive the desired left and right drive velocity signals and the actual left and right drive velocity signals, and control at least one of the left and right drive velocities.

11 Claims, 5 Drawing Sheets

APPARATUS AND METHOD FOR CONTROLLING THE STEERING OF A TRACKED MACHINE

TECHNICAL FIELD

This invention relates generally to an apparatus and method to control the steering of a tracked machine and, more particularly, to an apparatus and method using clutch/brake steering to control the steering of a tracked machine.

BACKGROUND ART

Tracked machines, e.g., track-type tractors, tracked loaders, and the like, generally employ one of two methods for steering. Each method offers unique advantages and disadvantages. Differential steering, for example, operates by applying differential power to each of a left and a right track on the tracked machine. A desired turn is accomplished by applying additional power to one of the tracks to increase the speed of the first track relative to the second track. Differential steering offers an advantage of highly accurate and controlled steering. However, differential steering is costly, the cost increasing dramatically as the machines become larger.

A second method, clutch/brake steering, costs less to implement than differential steering. However, clutch/brake steering does not provide the accuracy and control of differential steering. Clutch/brake steering functions by reducing speed at one of the tracks relative to the other track by engaging and disengaging either a clutch or brake or both for one track.

It is common for tracked machines to employ lower cost clutch/brake steering rather than differential steering, and sacrifice some level of accuracy and control. As a result, attempts have been made to compensate for some of the control disadvantages inherent with clutch/brake steering systems. For example, it is normally desired to disengage a clutch prior to engaging a brake to reduce sudden jerky movements of the tracked machine. This results in a deadband between clutch and brake response. This method works fairly well on level ground; however, if the tracked machine is on a slope, the weight of the machine causes loss of steering control during the deadband period.

In U.S. Pat. No. 5,325,933, Matsushita compensates for this problem by sensing the presence of a slope and responsively reducing the deadband between clutch engagement and brake disengagement. However, Matsushita does not account for a number of other variables, such as the initial velocity of the tracked machine, the desired turn radius, and the physical capability of the tracked machine to successfully negotiate a desired turn under various circumstances.

The use of clutch/brake steering systems becomes more complex as tracked machines are being developed which operate autonomously, semi-autonomously, or by remote control. Parameters of the machine which can be compensated for by a skilled operator, such as weight, center of gravity, velocity, desired turn radius, and various torques and forces being applied during movement of the machine, must be accounted for during a clutch/brake steering maneuver to maintain control of the machine. The above parameters must be evaluated to determine the manner in which the clutch/brake steering system operates.

The Matsushita patent described above is designed to enhance operator control of a tracked machine on a slope. However, the other parameters needed to operate the tracked machine in an autonomous or semi-autonomous manner are not compensated for by Matsushita. The Matsushita patent provides a means for clutch/brake steering to function more accurately when a machine is on a slope, but does not provide a means for a tracked machine to use clutch/brake steering autonomously.

In U.S. Pat. No. 4,702,358, Mueller et al. uses clutch/brake steering by sensing left and right track velocities, determining the difference between the left and right sensed velocities, comparing the sensed velocity differences to desired left and right track velocity differences, and responsively steering the tracked machine. However, for accuracy and control that approaches the level supplied by a differential steer system, in particular for a tracked machine operating autonomously, an improved clutch/brake steering control system is needed.

The present invention is directed to overcoming one or more of the problems as set forth above.

DISCLOSURE OF THE INVENTION

In one aspect of the present invention an apparatus for controlling the steering of a tracked machine having a clutch/brake steering system is disclosed. The tracked machine has a left drive and a right drive. The left drive has a clutch and brake and the right drive has a clutch and brake. The apparatus includes a navigator to determine a desired trajectory, determine a desired left drive velocity and a desired right drive velocity, and generate desired left and right drive velocity signals. The apparatus also includes a left speed sensor and a right speed sensor to determine actual left and right drive velocities, and generate actual left and right drive velocity signals. A clutch/brake controller is included to receive the desired left and right drive velocity signals and the actual left and right drive velocity signals, and control at least one of the left and right drive velocities.

In another aspect of the present invention a method for controlling the steering of a tracked machine having a clutch/brake steering system is disclosed. The tracked machine has a left drive and a right drive. The left drive has a clutch and brake and the right drive has a clutch and brake. The method includes the steps of determining a desired trajectory of the tracked machine, determining desired left and right drive velocities, and generating desired left and right drive velocity signals. The method also includes the steps of determining actual left and right drive velocities, generating actual left and right drive velocity signals, and controlling at least one of the left and right drive velocities.

BEST MODE FOR CARRYING OUT THE INVENTION

Figure 1:
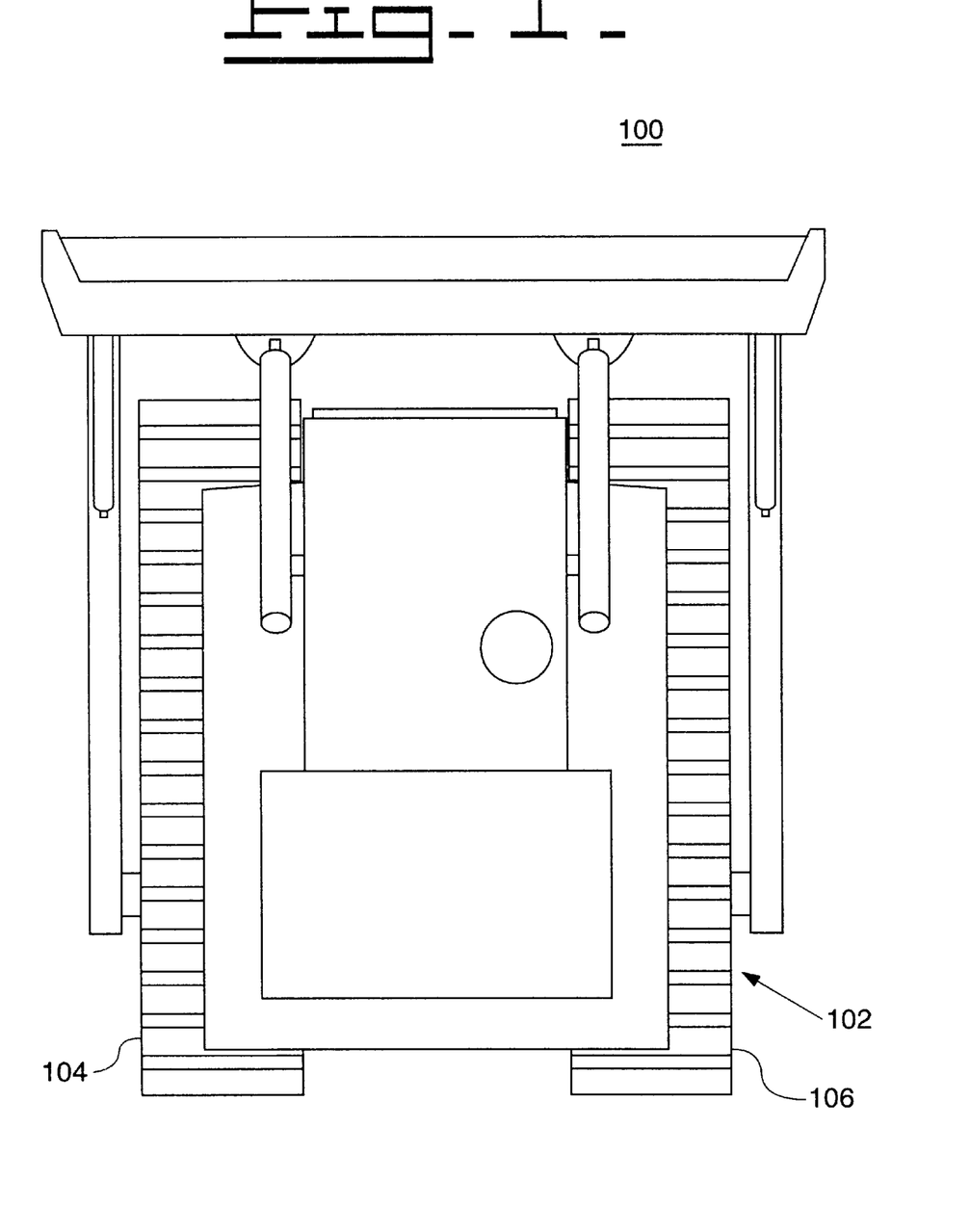
FIG. 1 is a diagrammatic illustration of a tracked machine as seen from a top view.

Referring to the drawings and, with particular reference to FIG. 1, a diagrammatic illustration of a top view of a tracked machine 102 is shown. The tracked machine 102 is shown as a track-type tractor used in earthworking applications.

However, other types of tracked machines may be used in the present invention, e.g., tracked loaders, agricultural tracked machines, and the like.

The tracked machine 102 has a left track 104 and a right track 106. Steering of the tracked machine 102 is performed by driving the left and right tracks 104,106 at different speeds, thus causing the tracked machine 102 to turn in the direction opposite the track being driven at the greater speed. For example, to turn to the right, the left track 104 is driven at a greater speed than the right track 106.

There are two common methods for causing the speeds of the left and right tracks 104,106 to differ. One method delivers differential power to the tracks and is known as differential steering. The other method reduces the power being delivered to one or both tracks by engaging and disengaging the brakes and clutches to the desired tracks. This method, known as clutch/brake steering, is used in the present invention.

Figure 2:
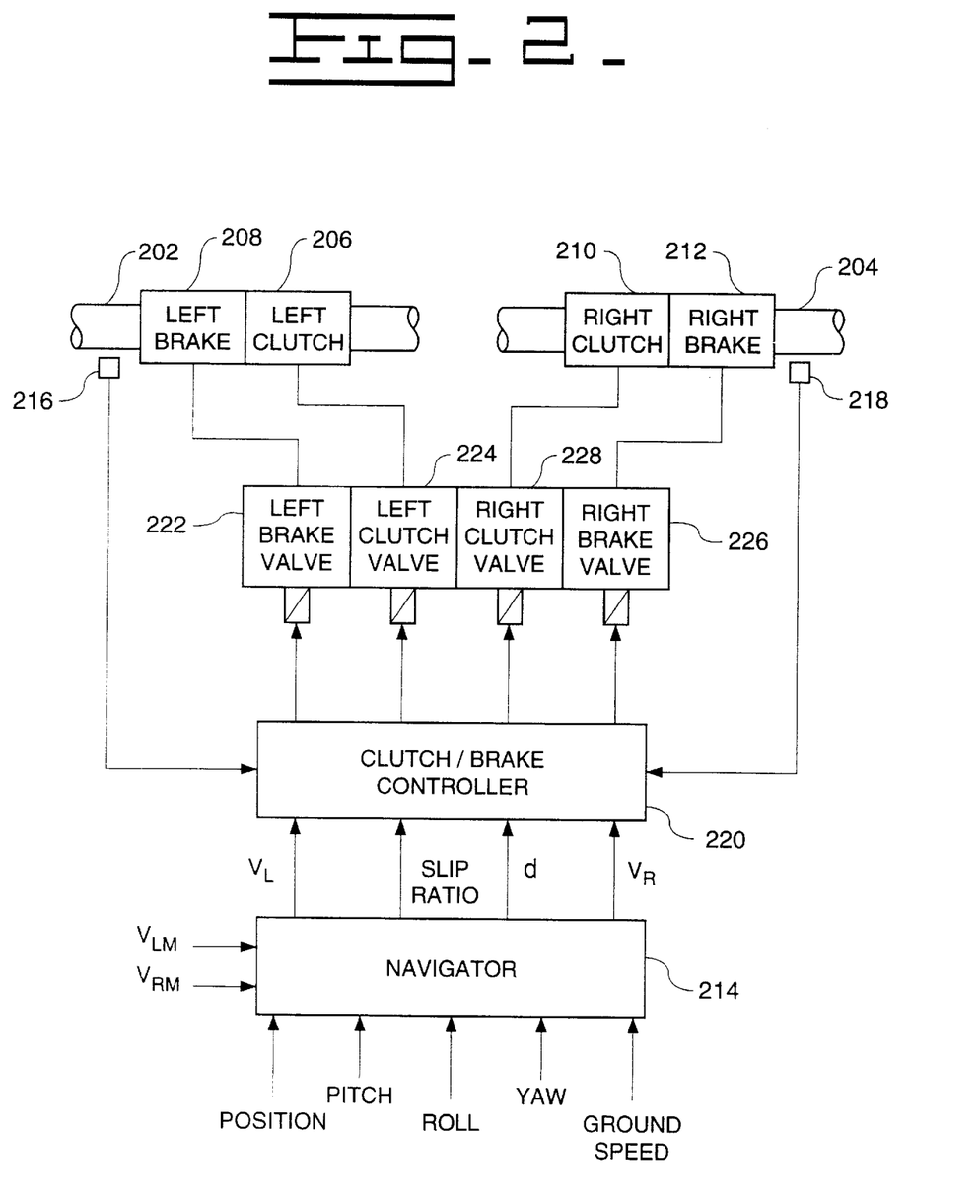
FIG. 2 is a block diagram illustrating an aspect of the present invention.

Referring now to FIG. 2, a block diagram of an embodiment of the present invention is shown. The tracked machine 102 has a left drive 202 and a right drive 204. The left drive 202 delivers power to the left track 104. The right drive 204 delivers power to the right track 106. The left drive 202 has a left clutch 206 and a left brake 208. The right drive 204 has a right clutch 210 and a right brake 212. Disengaging the left clutch 206 and the right clutch 210 removes the power being delivered to the left drive 202 and the right drive 204, respectively. Engaging the left brake 208 and the right brake 212 applies brakes to the left drive 202 and the right drive 204, respectively.

A navigator 214, located on the tracked machine 102, determines desired trajectories as the tracked machine 102 traverses a work area. A determined trajectory includes path information to traverse from a present position to a desired position, including a determination of a curvature and a heading of the path needed to move to the desired position.

Navigators on mobile machines are not new in the art. For example, in U.S. Pat. No. 5,648,901, Gudat et al. discloses a system which uses a navigator to generate paths for a mobile machine such as an off-road mining truck. The mining truck is configured to operate autonomously. The navigator determines a curved path needed to move to a desired location, and responsively controls steering of the truck to traverse the path.

The navigator used in the Gudat et al. patent controls the truck by controlling an angle of steering of the front wheels of the truck. The navigator 214 of the present invention must control the tracked machine 102 by controlling the speed of the left and right tracks 104,106. More specifically, the navigator 214 determines a desired left drive velocity and a desired right drive velocity. The navigator 214 then generates a desired left drive velocity signal and a desired right drive velocity signal.

As shown in FIG. 2, the navigator 214 receives information related to the tracked machine 102 including, but not limited to, ground speed, position, pitch, yaw, and roll. Ground speed, preferably, may be sensed directly by a sensor such as doppler radar. Position is defined as the location of the tracked machine 102 with respect to the machine's surroundings, e.g., in geographical coordinates. Pitch is the front to back angle of inclination of the tracked machine 102, yaw is the deviation of the tracked machine 102 from a desired heading, and roll is the side to side angle of inclination of the tracked machine 102. The navigator 214 also receives values for left and right measured velocities, $V_{LM}$ and $V_{RM}$, respectively. The information received by the navigator 214 may be provided by a variety of sensors, including GPS and other position sensors, pitch and inclination sensors, and velocity sensors. Providing information of this type on a tracked machine is well known in the art and will not be discussed further.

The navigator 214 may be used, as discussed herein, in an autonomous mode by receiving the sensed information described above and determining the desired trajectory. However, in an alternate embodiment, the navigator 214 may be used with an operator of a manual operation tracked machine by receiving the information described above, and additionally receiving a desired steer command from the operator, e.g., an angular steer command from a steer lever. In this embodiment, the navigator 214 would receive the manual desired steer command and determine a desired trajectory subject to constraints determined from the sensed information. The operator may be located on the tracked machine 102 or may be operating the tracked machine 102 from a remote location.

The navigator 214 uses the values for the left and right measured velocities, $V_{LM}$ and $V_{RM}'$, and the sensed ground speed to determine a slip ratio for each of the left and right tracks 104,106.

In addition, the navigator 214 uses the received information to determine values of desired left and right drive velocities that are acceptable for the tracked machine 102 to use to perform the desired steering maneuver. For example, the tracked machine 102 may be traveling at a speed that requires reduction of velocity of both left and right tracks 104,106 to successfully negotiate a desired curve. As another example, the tracked machine 102 may be operating on a sloped surface, which may require an additional reduction of speed.

A left speed sensor 216, located on the tracked machine 102, determines an actual left drive velocity and generates an actual left drive velocity signal. In addition, a right speed sensor 218, located on the tracked machine 102, determines an actual right drive velocity and generates an actual right drive velocity signal.

In the preferred embodiment, the left and right speed sensors 216,218 sense angular velocities of the left and right drives 202,204 directly. Alternatively, the left and right speed sensors 216,218 sense the linear velocities of the left and right tracks 104,106 and convert these values to angular velocities. Other means may be used to determine the actual left and right drive velocities without deviating from the spirit of the invention.

A clutch/brake controller 220, located on the tracked machine 102, receives the desired left and right drive velocity signals from the navigator 214, receives the actual left and right drive velocity signals from the left and right speed sensors 216,218, and controls at least one of the left drive velocity and the right drive velocity of the tracked machine 102 in response to the difference in velocities between desired and actual. Operation of the clutch/brake controller 220 is disclosed in greater detail with reference to FIG. 3.

Figure 3:
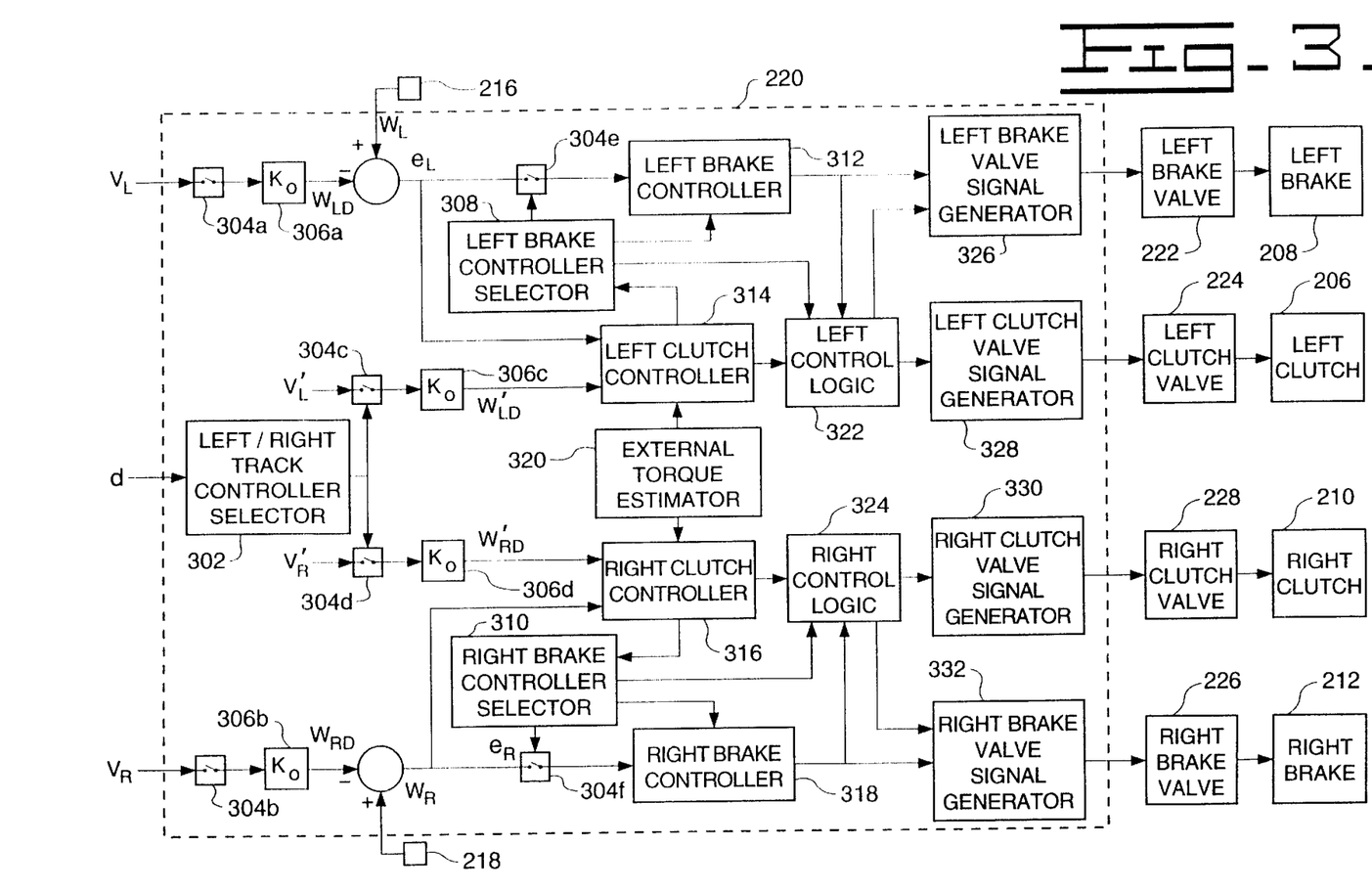
FIG. 3 is a block diagram of a clutch/brake controller as embodied in the present invention.

Referring to FIG. 3, a detailed block diagram of a preferred embodiment of the clutch/brake controller 220 is shown.

A left/right track controller selector 302 receives a signal d from the navigator 214. The signal d commands the left/right track controller selector 302 to enable control of the left drive 202, the right drive 204, or both. Enablement is accomplished by activating selector switches 304a,b to accept the left and right desired velocity signals $V_L, V_R$, respectively, from the navigator 214. Additional selector switches 304c,d allow controlled enablement of respective left and right desired acceleration signals $V_L'$,$V_R'$. The left and right desired acceleration signals $V_L'$,$V_R'$ are, in the preferred embodiment, computed by determining the derivatives of the left and right desired velocity signals $V_L$,$V_R$, and incorporating limitations based on the physical constraints of the tracked machine 102.

Linear velocity to angular velocity gain converters 306a,b convert the left and right desired velocity signals $V_L$,$V_R$, to respective left and right desired angular velocity signals $W_{LD}$,$W_{RD}$. In the same manner, linear acceleration to angular acceleration gain converters 306c,d convert the left and right desired acceleration signals $V_L'$,$V_R'$ to respective left and right desired angular acceleration signals $W_{LD}'$,$W_{RD}'$.

The left and right desired angular velocity signals $W_{LD}$, $W_{RD}$ are compared with the left and right actual angular velocity signals $W_L$,$W_R$ from the left and right speed sensors 216,218 to determine error differences $e_L$ and $e_R$.

As shown in FIG. 3, in the preferred embodiment of the present invention, the navigator 214 determines left and right desired velocity signals $V_L$,$V_R$ as linear velocities, which are converted to angular velocities in the clutch/brake controller 220. Alternatively, the navigator may determine the left and right desired velocity signals $V_L$,$V_R$ as angular velocities directly.

It can be appreciated by one skilled in the art that angular velocities of the left and right drives 202,204 of the tracked machine 102 correlate to linear velocities of the left and right tracks 104,106 if variables are accounted for, such as track slippage, final drive gear ratio, and effective radii of the drives and tracks. Factoring in these variables allows the present invention to be embodied using either angular velocities or linear velocities.

The clutch/brake controller 220 includes a left brake controller 312, a left clutch controller 314, a right brake controller 318, and a right clutch controller 316. The left clutch controller 314 and left brake controller 312 are controllably coupled together to control the left drive velocity. In like manner, the right clutch controller 316 and the right brake controller 318 are controllably coupled together to control the right drive velocity.

For ease of understanding, the operation of the left brake controller 312 and the left clutch controller 314 is discussed below in more detail. However, the discussion pertains also to operation of the right brake controller 318 and the right clutch controller 316.

The error difference $e_L$ is delivered to the left brake controller 312 and the left clutch controller 314. However, a left brake controller selector 308 is configured to controllably limit delivery of the error difference $e_L$ to the left brake controller 312 by controlling a selector switch 304e. A right brake controller selector 310 and a selector switch 304f perform a similar function for the right side.

An external torque estimator 320 determines a steering control external torque of the tracked machine 102, based on a plurality of parameters. The steering control external torque is determined by $$T_{REST} = M_g[(K_5 * \sin(\alpha)) - (K_6 * COT)],$$

where $T_{REST}$ is the steering control external torque of the tracked machine 102, $M_g$ is the weight of the tracked machine 102, $K_5$ is a parameter indicating a center of gravity of the tracked machine 102, $\alpha$ is an angle of inclination, e.g., pitch and roll, of the tracked machine 102, $K_6$ is a parameter indicating a torque due to a tractive force of the tracked machine 102, and COT is a coefficient of traction determined as a function of the material over which the tracked machine 102 traverses.

The weight of the tracked machine 102 is predetermined and may be a function of the tracked machine 102 carrying a full load or traveling with no load. The center of gravity of the tracked machine 102 is predetermined and is a function of the physical dimensions and weight distribution of the tracked machine 102. The angle of inclination may be determined by means that are well known in the art, including, for example, pitch and roll angle sensors such as inclinometers. The torque due to tractive force of the tracked machine 102 is predetermined and may be a function of the design and composition of the left and right tracks 104,106. The coefficient of traction is determined by previous knowledge of the type of material over which the tracked machine 102 traverses. Examples of coefficients of traction may include, but are not limited to, loose sand having a COT of 0.30, clay having a COT of 0.90, and average earth having a COT of 0.60.

The external torque estimator 320 delivers the steering control external torque value to the left and right clutch controllers 314,316.

Returning to discussion of the left drive controller portion with the understanding that the right drive controller portion performs a similar function, the left clutch controller 314 receives the error difference $e_L$, the left desired acceleration signal $W_{LD}'$, and the steering control external torque value $T_{REST}$, and responsively determines if control of the left drive 202 for steering purposes requires clutch control, brake control, or a combination of clutch and brake control, i.e., coupled clutch/brake control. The left brake controller selector 308, in response to receiving a command from the left clutch controller 314, delivers a command signal to a left control logic module 322, which enables the desired control combination for the left drive 202. In the same manner, a right control logic module 324 receives a command signal from the right brake controller selector 310, and responsively enables the desired control combination for the right drive 204.

The clutch/brake controller 220 also includes a left brake valve signal generator 326, a left clutch valve signal generator 328, a right brake valve signal generator 332, and a right clutch valve signal generator 330. In the preferred embodiment, each valve signal generator 326,328,330,332 receives a signal from a respective controller 312,314,316, 318 indicating a desired torque to apply to the corresponding brake and clutch 208,206,210,212. The torque value is converted to a cylinder pressure value, since engagement and disengagement of each brake and clutch 208,206,210, 212 is driven by hydraulic cylinders.

Each valve signal generator 326,328,330,332 includes a nonlinear transformer (not shown) which converts each cylinder pressure value to a corresponding electrical current value. Each electrical current value is delivered to a corresponding one of a left brake valve 222, a left clutch valve 224, a right clutch valve 228, and a right brake valve 226. Each valve 222,224,228,226 then engages or disengages the corresponding brake and clutch 208,206,210,212.

Figure 4:
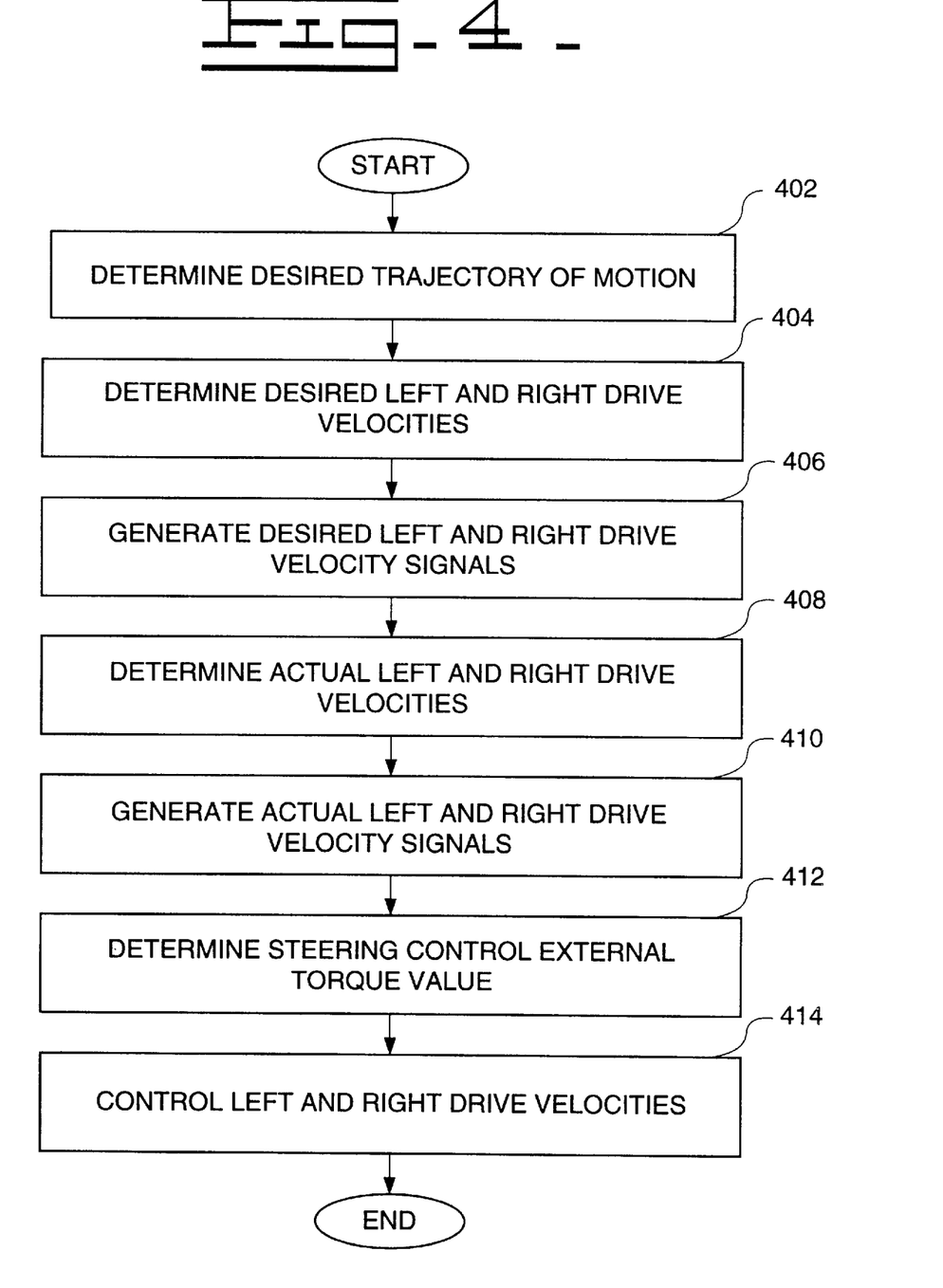
FIG. 4 is a flow diagram illustrating a method of the present invention.

Referring now to FIG. 4, a flowchart illustrating a preferred embodiment of a method of the present invention is shown.

In a first control block 402, a desired trajectory of motion of the tracked machine 102 is determined by the navigator 214.

In a second control block 404, desired left and right drive velocities are determined as a function of the desired trajectory and physical constraints of the tracked machine 102. Control then proceeds to a third control block 406 where desired left and right drive velocity signals are generated.

In a fourth control block 408, actual left and right drive velocities are determined, preferably from left and right speed sensors 216,218. Actual left and right drive velocity signals are then generated, as shown in a fifth control block 410.

Control then proceeds to a sixth control block 412, where the external torque estimator 320 determines a steering control external torque value.

In a seventh control block 414, at least one of the left and right drive velocities is controlled as a function of the desired left and right drive velocity signals, the actual left and right drive velocity signals, and the steering control external torque value.

Figure 5:
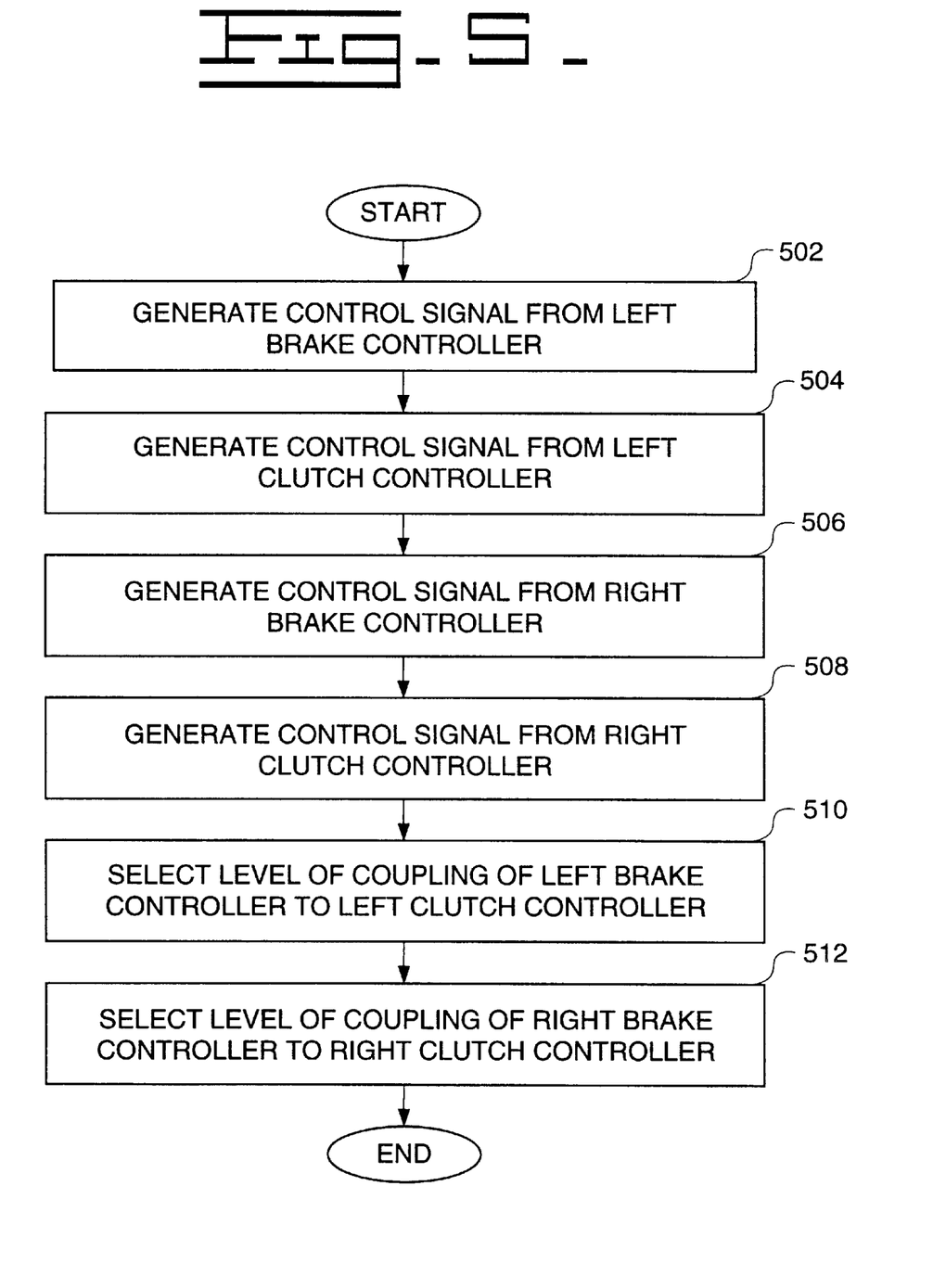
FIG. 5 is a flow diagram further illustrating the method embodied in FIG. 4.

With reference to FIG. 5, a flowchart is shown illustrating further aspects of a preferred embodiment of the present invention.

In a first control block 502, a control signal is generated from the left brake controller 312. In a second control block 504, a control signal is generated from the left clutch controller 314. In a third control block 506, a control signal is generated from the right brake controller 318. In a fourth control block 508, a control signal is generated from the right clutch controller 316. Each of these four control signals is used to control the respective brake and clutch 208,206, 212,210.

In a fifth control block 510, a level of coupling of the left brake controller 312 to the left clutch controller 314 is selected by the left brake controller selector 308 in response to receiving a command from the left clutch controller 314. In like manner, in a sixth control block 512, a level of coupling of the right brake controller 318 to the right clutch controller 316 is selected by the right brake controller selector 310 in response to receiving a command from the right clutch controller 316.

Industrial Applicability

In an example of an application of the present invention, track-type tractors are used to move earth in a work area for a variety of reasons. For example, track-type tractors may be used to shape an area to a desired contour, remove overburden material to expose coal or ore at a mining site, or spread material, e.g., fill dirt, refuse, and the like, over a site for later compaction.

As technologies develop and improve, it is becoming increasingly desirable and feasible to automate all or part of the operation of these track-type tractors. Similar autonomous developments have been developed for wheel-type mobile machines. However, track-type tractors use track steering to maneuver. This difference in method of steering introduces new problems to overcome to control steering of track-type tractors in an autonomous or semi-autonomous environment.

The present invention provides the cost efficiency of clutch/brake steering of a tracked machine while offering the advantages that increased control and accuracy that more expensive differential steering provides, thus making the present invention ideal for autonomous applications, or for applications which provide enhanced steering control for an operator by making at least some of the steering control functions semi-autonomous.

Other aspects, objects, and features of the present invention can be obtained from a study of the drawings, the disclosure, and the appended claims.

What is claimed is:

1. An apparatus for controlling the steering of a tracked machine having a clutch/brake steering system, the tracked machine having a left drive and a right drive, the left drive having a left clutch and a left brake, the right drive having a right clutch and a right brake, comprising:
   a navigator located on the tracked machine to determine a desired trajectory, responsively determine a desired left drive velocity and a desired right drive velocity, and generate a desired left drive velocity signal and a desired right drive velocity signal, respectively;
   a left speed sensor located on the tracked machine to determine an actual left drive velocity and generate an actual left drive velocity signal;
   a right speed sensor located on the tracked machine to determine an actual right drive velocity and generate an actual right drive velocity signal; and
   a clutch/brake controller located on the tracked machine adapted to receive the desired left drive velocity signal, the desired right drive velocity signal, the actual left drive velocity signal, and the actual right drive velocity signal, and responsively control at least one of the left drive velocity and the right drive velocity;
   wherein the clutch/brake controller further includes an external torque estimator to determine a steering control external torque of the tracked machine, and responsively deliver a steering control external torque value to the clutch/brake controller.

2. An apparatus, as set forth in claim 1, wherein the clutch/brake controller includes:
   a left clutch controller and a left brake controller, the left clutch and left brake controllers being controllably coupled together to control the left drive velocity; and
   a right clutch controller and a right brake controller, the right clutch and right brake controllers being controllably coupled together to control the right drive velocity.

3. An apparatus, as set forth in claim 2, wherein the external torque estimator is adapted to deliver the steering control external torque value to the left clutch controller and the right clutch controller.

4. An apparatus, as set forth in claim 3, wherein the external torque estimator includes means for determining an angle of inclination of the tracked machine.

5. An apparatus, as set forth in claim 4, wherein the means for determining an angle of inclination includes at least one of a pitch angle sensor and a roll angle sensor.

6. An apparatus, as set forth in claim 4, wherein the steering control external torque of the tracked machine is determined by:

$$T_{REST} = M_g[(K_5 * \sin(\alpha)) - (K_6 * COT)],$$

where $T_{REST}$ is the steering control external torque of the tracked machine, $M_g$ is the weight of the tracked machine, $K_5$ is a parameter indicating a center of gravity of the tracked machine, $\alpha$ is the angle of inclination of the tracked machine, $K_6$ is a parameter indicating a torque due to a tractive force of the tracked machine, and COT is a coefficient of traction determined as a function of the material over which the tracked machine traverses.

7. An apparatus, as set forth in claim 2, wherein the clutch brake controller further includes:
   a left brake valve signal generator adapted to receive a control signal from the left brake controller, and responsively control the left brake;
   a left clutch valve signal generator adapted to receive a control signal from the left clutch controller, and responsively control the left clutch;

a right brake valve signal generator adapted to receive a control signal from the right brake controller; and responsively control the right brake; and a right clutch valve signal generator adapted to receive a control signal from the right clutch controller, and responsively control the right clutch.

8. An apparatus, as set forth in claim 2, wherein the clutch/brake controller further includes:

a left brake controller selector to determine a level of coupling of the left brake controller to the left clutch controller; and a right brake controller selector to determine a level of coupling of the right brake controller to the right clutch controller.

9. A method for controlling the steering of a tracked machine having a clutch/brake steering system, the tracked machine having a left drive and a right drive, the left drive having a left clutch and a left brake, the right drive having a right clutch and a right brake, including the steps of:

determining a desired trajectory of motion of the tracked machine;

determining a desired left drive velocity and a desired right drive velocity as a function of the desired trajectory;

generating a desired left drive velocity signal and a desired right drive velocity signal;

determining an actual left drive velocity and responsively generating an actual left drive velocity signal;

determining an actual right drive velocity and responsively generating an actual right drive velocity signal;

determining a steering control external torque value of the tracked machine; and controlling at least one of the left drive velocity and the right drive velocity as a function of the desired left drive velocity signal, the desired right drive velocity signal, the actual left drive velocity signal, the actual right drive velocity signal, and the steering control external torque value.

10. A method, as set forth in claim 9, wherein controlling at least one of the left drive velocity and the right drive velocity includes the steps of:

generating a control signal from a left brake controller to control the left brake;

generating a control signal from a left clutch controller to control the left clutch;

generating a control signal from a right brake controller to control the right brake; and generating a control signal from a right clutch controller to control the right clutch.

11. A method, as set forth in claim 10, wherein controlling at least one of the left drive velocity and the right drive velocity further includes the steps of:

selecting a level of coupling of the left brake controller to the left clutch controller; and selecting a level of coupling of the right brake controller to the right clutch controller.

* * * * *